US007962296B2

(12) United States Patent
Ashton

(10) Patent No.: US 7,962,296 B2
(45) Date of Patent: Jun. 14, 2011

(54) MODULE FOR DATA ACQUISITION AND CONTROL IN A SENSOR/CONTROL NETWORK

(75) Inventor: Martin Ashton, Singapore (SG)

(73) Assignee: Drone Technology Pte Ltd, Singapore (SG)

( * ) Notice: Subject to any disclaimer, the term of this patent is extended or adjusted under 35 U.S.C. 154(b) by 452 days.

(21) Appl. No.: 12/209,880

(22) Filed: Sep. 12, 2008

(65) Prior Publication Data

US 2009/0271131 A1    Oct. 29, 2009

Related U.S. Application Data

(63) Continuation of application No. PCT/SG2008/000135, filed on Apr. 23, 2008.

(30) Foreign Application Priority Data

Apr. 23, 2008 (SG) .................. PCT/SG2008/000135

(51) Int. Cl.
*G06F 13/00* (2006.01)
*G06F 19/00* (2006.01)

(52) U.S. Cl. ........................................ 702/57
(58) Field of Classification Search ............. 702/57
See application file for complete search history.

(56) References Cited

U.S. PATENT DOCUMENTS

| | | | |
|---|---|---|---|
| 4,370,709 A * | 1/1983 | Fosdick | ............ 703/26 |
| 5,502,822 A * | 3/1996 | Takebe | ............ 710/316 |
| 5,566,320 A * | 10/1996 | Hubert | ............ 711/147 |
| 6,125,426 A | 9/2000 | Yoneda et al. | |
| 7,046,166 B2 | 5/2006 | Pedyash et al. | |
| 7,049,952 B2 | 5/2006 | Kulesz et al. | |
| 7,286,415 B2 * | 10/2007 | Kwon | ............ 365/189.04 |
| 7,298,259 B2 | 11/2007 | Moriwaki | |
| 2002/0069337 A1 | 6/2002 | Hsia et al. | |
| 2002/0149972 A1 | 10/2002 | Lamb et al. | |
| 2003/0163653 A1 | 8/2003 | Skendzic et al. | |
| 2006/0013065 A1 | 1/2006 | Varsamis et al. | |
| 2006/0092866 A1 * | 5/2006 | Kim et al. | ............ 370/310 |
| 2007/0101070 A1 | 5/2007 | Matsunami et al. | |
| 2007/0281758 A1 | 12/2007 | Ara et al. | |

OTHER PUBLICATIONS

International Preliminary Report on Patentability dated Nov. 4, 2010 from corresponding PCT Application No. PCT/SG2008/000135.
International Search Report dated Jul. 18, 2008 from corresponding PCT Application No. PCT/SG2008/000135.
Written Opinion dated Jul. 18, 2008 from corresponding PCT Application No. PCT/SG2008/000135.

* cited by examiner

*Primary Examiner* — Cindy Hien-Dieu Khuu
(74) *Attorney, Agent, or Firm* — Lando & Anastasi, LLP

(57) ABSTRACT

A data acquisition and/or control module (101) for interfacing with a device (115) is provided. The module (101) and device (115) form part of a sensor/control network. The module (101) comprises a transceiver (103) for receiving data from and transmitting data to the sensor/control network, a first microcontroller (107) connected to a second microcontroller (109), first and second memories (105*a*, 105*b*) external to both the first and second microcontrollers (107, 109), and switching means. The first microcontroller (107) is further connected to the transceiver (103), while the second microcontroller (109) is further for connecting to the device (115). The switching means are operable to connect one of the first and second microcontrollers (107, 109) selectively to one of the first and second memories (105*a*, 105*b*), and to connect the respective other of the first and second microcontrollers (107, 109) to the respective other of the first and second memories (105*a*, 105*b*).

23 Claims, 11 Drawing Sheets

MODULE FOR DATA ACQUISITION AND CONTROL IN A SENSOR/CONTROL NETWORK

FIELD OF THE INVENTION

This invention relates to a data acquisition and/or control module for interfacing with a device, and for communicating with one or more further data acquisition and/or control modules, each of which interfaces with a further respective device. Thus, the set of modules and devices forms a distributed network. The devices may be sensors and/or actuators, so the network is a network of sensors and/or actuators (a "sensor/control network").

BACKGROUND OF THE INVENTION

A distributed sensor/control network is a network of spatially distributed autonomous nodes which include "sensor nodes" (which include one or more sensors) and actuator nodes (which include one or more actuators). A distributed sensor/control network may contain any number of sensor nodes or actuator nodes. Some nodes may include both actuators and sensors (e.g. a sensor which detects the state of the actuator), and thus fall into both the categories of sensor node and actuator node. The actuators are controlled based on the output of the sensors which monitor real-time events/tasks at different locations.

It is known for each sensor node to comprise a wireless transceiver, a microprocessor, a power source, and one or more sensors. The wireless transceiver transmits data to and receives data from other sensor nodes within the network using radio frequency. The microprocessor processes sensor data gathered from the corresponding sensor(s), for example converting analog sensor data to digital sensor data—including signal sampling, signal filtering and/or signal conditioning—before transmitting the processed data onward to the wireless transceiver. In addition, the microprocessor controls functionality of the wireless transceiver and sensor(s) in the sensor node. The power source, for example batteries, is required to power the sensor(s), microprocessor and the wireless transceiver for data acquisition, data processing and data communication. The sensor(s) monitors and tracks changes to a physical condition, for example temperature and pressure, to generate sensor data in the form of analog or digital signals which are then transmitted to the microprocessor for processing. An actuator node similarly comprises a wireless transceiver, a single microprocessor, a power source and one or more actuators. The microprocessor controls the actuator(s) by sending to it control data based on signals received from the transceiver.

The microprocessors of both types of node have to be computationally sophisticated, since they receive data simultaneously from multiple sources, and/or while emitting control data. They therefore typically require bespoke and sophisticated programming, and high computational power. Designing such a network is therefore a complicated procedure, and implementing it is expensive.

SUMMARY OF THE INVENTION

A first aspect of this invention is a data acquisition and/or control module for interfacing with a device and for communicating with one or more further data acquisition and/or control modules within a sensor/control network. Each of the further modules is also suitable for interfacing with a respective device. The modules and respective devices thus form a sensor/control network. The data acquisition and/or control module comprises a transceiver for receiving data from and transmitting data to the sensor/control network, a first microcontroller connected to a second microcontroller, first and second memories arranged external to the first and second microcontrollers, and also switching means. The first microcontroller is further connected to the transceiver, while the second microcontroller is suitable for connecting to the device. The switching means is operable to connect one of the first and second microcontrollers selectively to one of the first and second memories, and to connect the respective other of the first and second microcontrollers to the respective other of the first and second memories.

Thus, each of the first and second microcontrollers writes data to or reads data from any one of the first and second memories, and operates substantially independently of the other, so that the operation of either microcontroller is not interrupted by the other. Each microcontroller writes to/reads from the memory to which it is at that time connected; then, when the selection changes, reads data from/writes data to the other memory. Thus, each of the microcontrollers is not overloaded with data, and there are buffers to receive data which a microcontroller may not at that moment be able to receive. The microcontrollers may be implemented without sophisticated programming and with relatively low computational power. In fact, the microcontrollers have a frequency of less than 100 MHz, in contrast to the more powerful "microprocessors" used in the prior art above.

By the term "external" is meant that if the microcontrollers are implemented by respective integrated circuits, the memories are not part of the same integrated circuits.

Indeed, the microcontrollers may be selected to have different operating frequencies from each other. For example, the first microcontroller may have a frequency which is optimised for the requirements of the transceiver, while the second microcontroller has a frequency which is selected to suit the device. There may be multiple clocks in the module (i.e. to generate the respective clock signals), or one clock signal may be derived from the other. The two memories may be operated at any time based on the clock signal of the microcontroller to which they are at that time connected.

Each of the first and second memories may also have a comparatively larger data storage capacity than any of the first and second microcontrollers for storing program upgrades for one or both of the first and second microcontrollers. Thus, each of the microcontrollers is preferably operable to install software on the other microcontroller. In this sense, neither is purely a "slave" to the other.

Further, the switching means may be operable to connect the transceiver selectively to one of the first and second memories. Thus, data received by the transceiver may first be stored in one of the first and second memories while the first and second microcontrollers are communicating with each other. When the first and second microcontrollers are no longer communicating with each other, the first microcontroller may then retrieve that data from the corresponding memory for subsequent processing. Thus, loss of data received from the transceiver may be prevented.

Further, the switching means may be further operable to connect the device selectively to one of the first and second memories. Thus, data transmitted from the device may first be stored within one of the first and second external memories if the first and second microcontrollers are communicating with each other. When the first and second microcontrollers are no longer communicating with each other, the second microcontroller may then retrieve that data from the corresponding memory for subsequent processing. Thus, loss of data transmitted from the device to the module may be prevented.

A second aspect of this invention is a data acquisition and/or control module for interfacing with a device and for communicating with one or more further data acquisition and/or control modules. Each of the further modules is also suitable for interfacing with a respective device. The modules and respective devices thus form a sensor/control network. The data acquisition and/or control module comprises a transceiver for receiving data from and transmitting data to the sensor/control network, a first microcontroller connected to a second microcontroller, a memory unit external to the first and second microcontrollers, and switching means. The first microcontroller is further connected to the transceiver, while the second microcontroller is further connected to the device. The switching means is operable to connect the memory unit selectively to one of the first microcontroller and the transceiver, or to connect the memory unit selectively to one of the second microcontroller and the device.

Thus, data received by the transceiver may be first stored within the memory unit if the first and second microcontrollers are communicating with each other. When the first and second microcontrollers are no longer communicating with each other, the first microcontroller may then retrieve that data from the memory unit for subsequent processing. Thus, loss of data received by the transceiver or transmitted from the device may be prevented.

Likewise, data transmitted from the device may be first stored within the memory unit if the first and second microcontrollers are communicating with each other. When the first and second microcontrollers are no longer communicating with each other, the second microcontroller may then retrieve that data from the memory unit for subsequent processing. Thus, loss of data transmitted from the device to the module may be prevented.

Further, the memory unit of the module according to the second aspect may comprise first and second memories.

Further, the switching means of the module according to the second aspect may be operable to connect the transceiver selectively to one of the first and second memories.

Thus, data received by the device may first be stored in one of the first and second memories while the first and second microcontrollers are communicating with each other. When the first and second microcontrollers are no longer communicating with each other, the first microcontroller may then retrieve that data from the corresponding memory for subsequent processing. Thus, loss of data received from the transceiver may be prevented.

Further, the switching means of the module according to the second aspect may be operable to connect the first microcontroller selectively to one of the first and second memories.

Further, the switching means of the module according to the second aspect may be operable to connect the second microcontroller selectively to one of the first and second memories.

Further, the switching means of the module according to the second aspect may be operable to connect the device selectively to one of the first and second memories.

Thus, data transmitted from the device may first be stored within one of the first and second external memories if the first and second microcontrollers are communicating with each other. When the first and second microcontrollers are no longer communicating with each other, the second microcontroller may then retrieve that data from the corresponding memory for subsequent processing. Thus, loss of data transmitted from the device to the module may be prevented.

The transceiver of the module according to both the first and second aspect may be operable to transmit data wirelessly to and receive data wirelessly from the sensor/control network. Optionally, the transceiver may transmit and receive data non-wirelessly.

Further, the switching means of the module according to both the first and second aspects may be further operable to connect the first microcontroller selectively to one of the second microcontroller and the device.

Optionally, the module according to both the first and second aspects comprises a Universal Serial Bus (USB) connector for interfacing with the device.

A third aspect of this invention is a computing apparatus which comprises a microcontroller and a plurality of the data acquisition and/or control modules for communicating with the data acquisition and/or control modules as defined above. Both the microcontroller and the plurality of modules are arranged on a common data bus such that a communication pathway is established between the microcontroller and some or all of the modules.

A fourth aspect of this invention is a sensor/control network which comprises a plurality of any of the data acquisition and/or control modules as defined above, and the computing apparatus as defined above.

BRIEF DESCRIPTION OF THE DRAWINGS

Embodiments of the invention will now be described by way of example only, with reference to the accompanying drawings, of which.

DETAILED DESCRIPTION OF THE EMBODIMENTS

Figure 1:
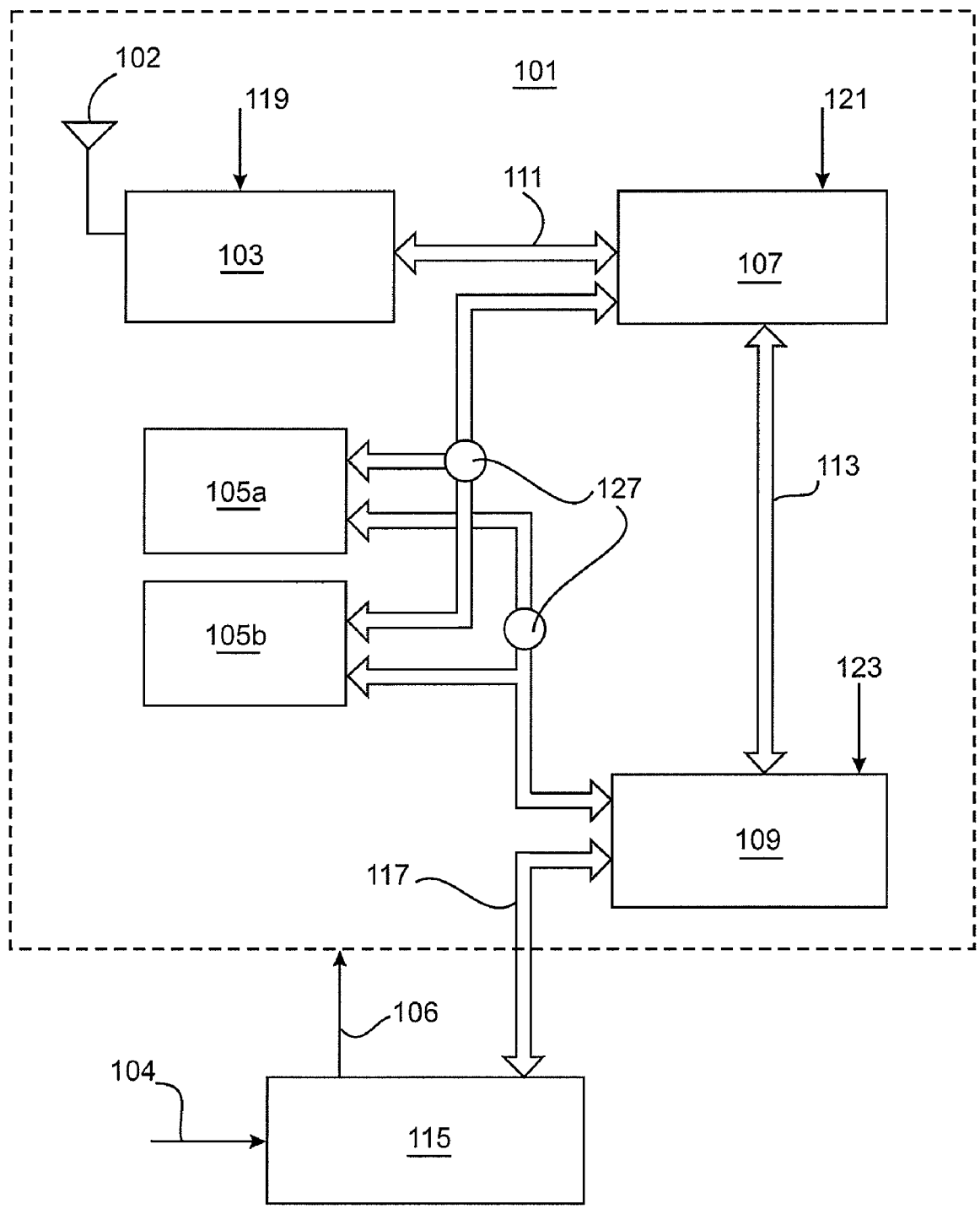
FIG. 1 is block diagram illustrating an architecture of a first embodiment of the data acquisition and/or control module.

FIG. 1 is a block diagram illustrating an architecture of a first data acquisition and/or control module ("module") 101 for interfacing with a device 115 within a sensor/control network. A power source 104—e.g. batteries—is supplied to the device 115 which accordingly provides a voltage 106 to the first module 101. The module 101 comprises an antenna 102 connected to a wireless transceiver 103 for transmitting data to and receiving data from the sensor/control network, two separate microcontrollers—i.e. a Data Management Controller ("DMC") 107 and a Data Acquisition and/or Control Manager ("DACM") 109-and two memories 105a, 105b arranged external to both the DMC 107 and DACM 109. The DMC 107 is connected to the DACM 109 so that a direct communication pathway is established between them. The primary role of the DMC 107 is for transmitting data to and receiving data from the wireless transceiver 103, while the primary role of the DACM 109 is for transmitting data to and receiving data from the device 115.

Optionally, the wireless transceiver 103 may be implemented by Cypress Semiconductor CYRF6936 2.4 GHz Radio SoC ("System on Chip"), which incorporates a 2.4 GHz Direct Sequence Spread Spectrum ("DSSS") radio transceiver and a Motorola 4 MHz Serial Peripheral Interface ("SPI").

Each of the DMC 107 and DACM 109 is a computer-on-a-chip which is made up of a type of microcontroller—i.e. an integrated circuit—suitable for high integration and low power consumption. Optionally, each of the DMC 107 and DACM 109 may integrate additional elements such as read-write memory for data storage and read-only memory for code storage.

The DMC 107 may be implemented by the Microchip 24FJ64GA004 16-bit microcontroller which features two SPI ports and a maximum instruction execution speed of 16MIPS. A first SPI port of the DMC 107 connects directly to a corresponding port of the wireless transceiver 103 through a first serial data link 111, such that a direct communication pathway is established between the DMC 107 and the wireless transceiver 103. Accordingly, the DMC 107 controls the wireless transceiver 103 to transmit data from the module 101 and to receive data transmitted to the module 101.

It should be appreciated that combination of the antenna 102 and wireless transceiver 103 can be optionally replaced by a non-wireless communication unit for connecting with, for example, a routing hub for transferring data between the module 101 and the sensor/control network. Such a communication unit would be useful in electromagnetically "noisy" environments or where high communication speeds are required between the module 101 and the rest of the sensor/control network.

As further shown in FIG. 1, a second SPI port of the DMC 107 connects directly to a corresponding port of the DAMC 109 through a second serial data link 113, such that a direct communication pathway is also established between the DMC 107 and the DACM 109.

The DACM 109 may also be implemented by the Microchip 24FJ64GA004 16-bit microcontroller. Thus, one of the SPI ports of the DACM 109 connects directly to the corresponding SPI port of the DMC 107 through the second serial data link 113, while the other SPI port of the DACM 109 connects directly to a 9-pin header of the device 115, such that a direct communication pathway 117 is established between the DACM 109 and the device 115.

Each of the wireless transceiver 103, DMC 107, and DACM 109 has an independent clock generator 119, 121, 123 for producing timing signals to synchronise circuit operations. For example, the wireless transceiver 103 has a dedicated 12 MHz crystal for its internal clock control and a clock output of 1.5, 3, 6 or 12 MHz. The DMC 107 and DACM 109 may have numerous options for clocking frequency using both internal and external clock schemes ranging from 31.25 KHz, for low power (sleep mode) applications, up to 32 MHz using internal phase locked loop ("PLL") for high speed applications.

Each of the first and second memories 105a, 105b may be implemented by Microchip 25LC256 which features a 10 MHz SPI microcontroller interface and 256 Kbytes of serial RAM. Alternatively, each of the first and second memories 105a, 105b may be implemented by non-volatile memory such as flash memory.

The DMC 107 and DACM 109 may connect to any one of the first and second memories 105a, 105b such that direct communication pathways are established between any one of the DMC 107 and DACM 109 and any one of the first and second memories 105a, 105b. Accordingly, the DMC 107 and DACM 109 may transmit data to and/or receive data from any one of the first and second memories 105a, 105b.

Preferably, each of the first and second memories 105a, 105b has a comparatively larger data storage capacity than any of the DMC 107 and DACM 109 so that program upgrades for any or both of microcontrollers may be stored in one or both of the first and second memories 105a, 105b.

In addition, the first module 101 comprises switching means 127 operable to connect any one of the DMC 107 and DACM 109 selectively to either of the first and second memories 105a, 105b, and to connect the respective other of the DMC 107 and DACM 109 to the respective other of the first and second memories 105a, 105b. The switching means 127 may comprise a plurality of switches arranged on the serial links between each of the first and second memories 105a, 105b and each of the DMC 107 and DACM 109. Logic of each of the switches can then be controlled by the DMC 107 and/or DACM 109 to determine if a direct communication should be established between the DMC 107 and the external memories 105a, 105b, or between the DACM 109 and the external memories 105a, 105b.

Thus, the switching means 127 prevents concurrent access of any of the first and second memories 105a, 105b by both the DMC 107 and DACM 109. Accordingly, clash of read/write commands transmitted concurrently from both the DMC 107 and DACM 109 to any one of the first and second memories 105a, 105b may be avoided.

Figure 2:
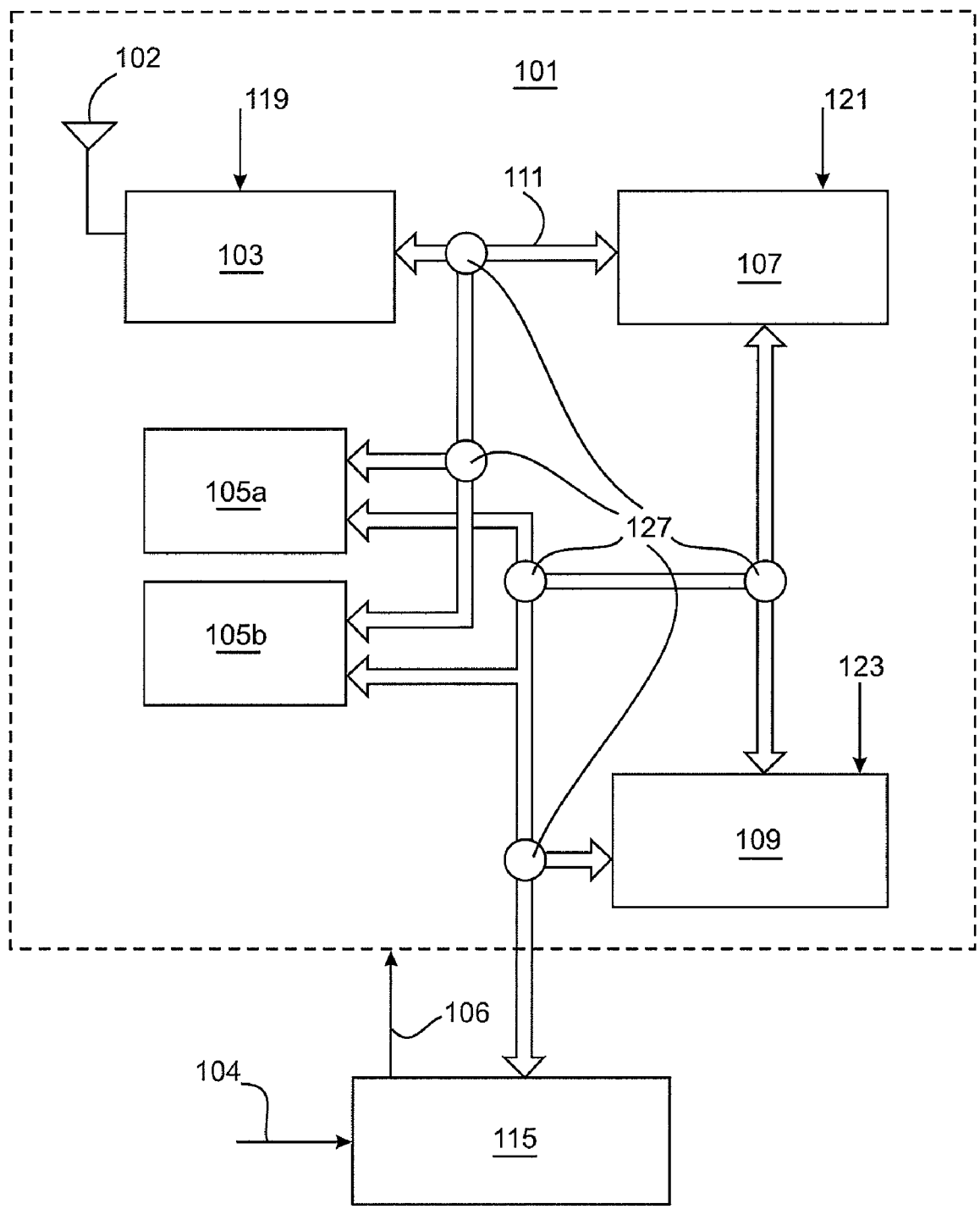
FIG. 2 is a block diagram illustrating an alternative architecture of the data acquisition and/or control module of FIG. 1.

Optionally, the switching means 127 is further operable to connect the wireless transceiver 103 selectively to any one of the first and second memories 105a, 105b—as shown in FIG. 2. Thus, data received by the wireless transceiver 103 from a remote data acquisition and/or control module can be transmitted to either of the first and second memories 105a, 105b, instead of transmitting that data directly to the DMC 107. In addition, data transmitted from the DMC 107 may first be stored in one of the first and second memories 105a, 105b before being transmitted to the wireless transceiver 103 for onward transmission to the rest of the sensor/control network. Advantageously, if the wireless transceiver 103 cannot establish communication with the rest of the sensor/control network either due to RF interference or that because a target device of the sensor/control network is busy, that data can be stored in either of the memories 105a, 105b pending reconnection to the sensor/control network. Thus, this minimises loss of data transmitted from the DMC 107 and also avoids the need of the DMC 107 to resend data.

Further, the data received by the wireless transceiver 103 may be first stored within any of the first and second memories 105a, 105b if the DMC 107 and DACM 109 are communicating with each other. When the DMC 107 and DACM 109 are no longer communicating with each other, the DMC 107 may then retrieve that data from the corresponding external memory for subsequent processing. Thus, loss of data received from the wireless transceiver 103 may be prevented.

Optionally also, the switching means 127 is further operable to connect the device 115 selectively to one of the first and second memories 105a, 105b. Thus, data transmitted from the device 115 to the module 101 can be transmitted to either of the first and second memories 105a, 105b, instead of directly to the DACM 109. In addition, data transmitted from the DACM 109 may first be stored in one of the first and second memories 105a, 105b before being transmitted to the device 115. Thus, if the DACM 109 receives data from the DMC 107 which may be for controlling the device 115 but the device 115 is busy at that time, the DACM could first store that data in either of the memories 105a, 105b destined for the device, answer any request from the DMC 107 and then reload that data from the corresponding memory 105a, 105b at a later time when communication with the device 115 is successful.

Further, data transmitted from the device 115 may be first stored in any of the first and second memories 105a, 105b if the DMC 107 and DACM 109 are communicating with each other. When the DMC 107 and DACM 109 are no longer communicating with each other, the DACM 109 may then retrieve that data from the corresponding external memory for subsequent processing. Thus, loss of data transmitted from the device 115 may be prevented.

Yet further, large data packets such as program files or data-logging files (temperature records, health/status monitoring) which are required by the sensor/control network at a much lower frequency than the main sensor/control data may be stored in the memories 105a, 105b. Thus, data traffic within the sensor/control network is reduced.

Figure 3:
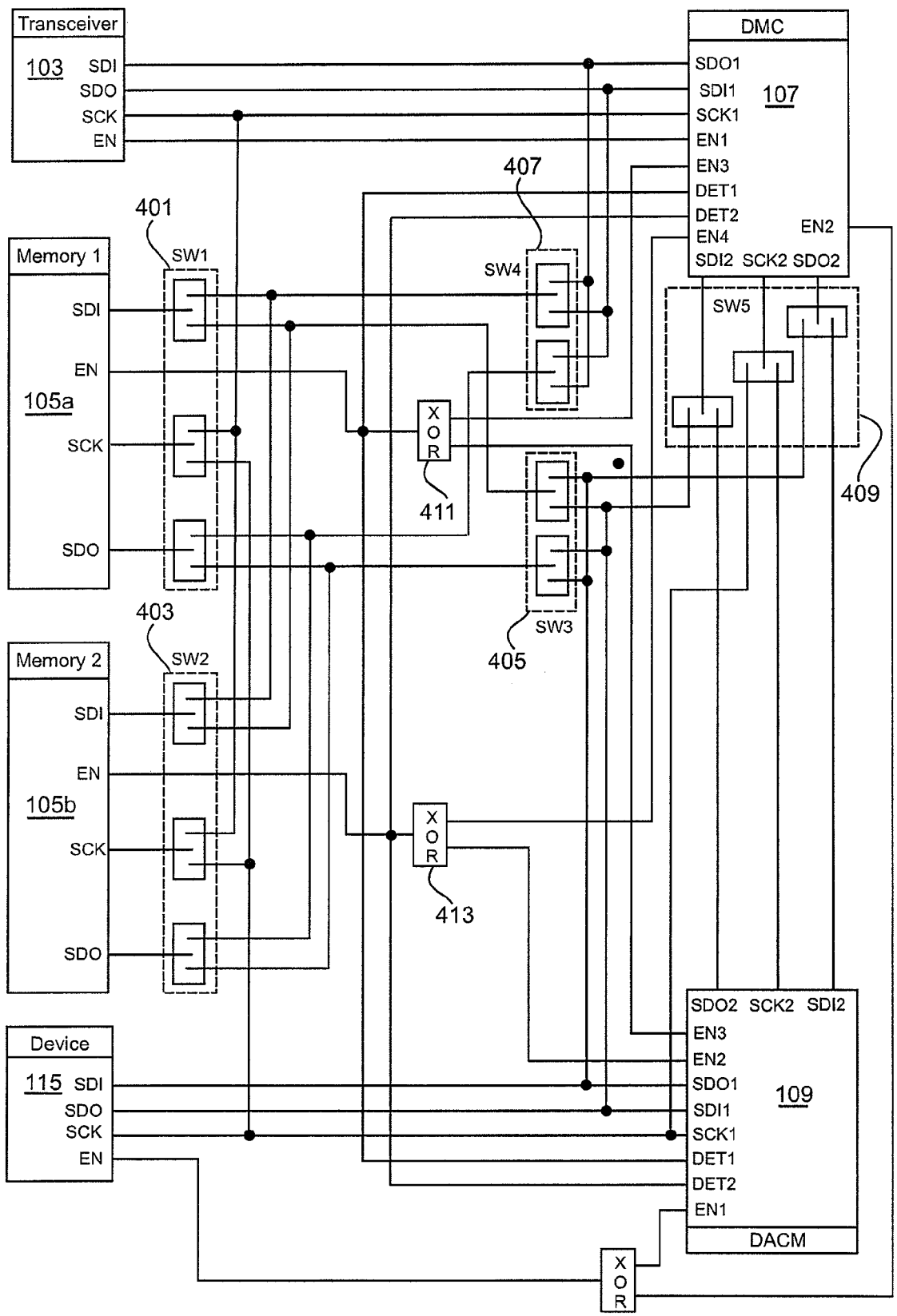
FIG. 3 is a circuit diagram illustrating the interconnections of internal components of the data acquisition and/or control module of the first embodiment.

FIG. 3 illustrates a schematic diagram of the first module 101. The switching means 127 comprises five bi-directional switches 401, 403, 405, 407, and 409. The DMC 107 controls switches 401, 405, and 409, while the DACM 109 controls switches 403 and 407. For sake of simplicity, FIG. 3 does not illustrate the interconnections of the DMC 107 and DACM 109 to the respective switches.

Switch 401 is operable to route data transmitted to or received from the first memory 105a via switch 405 or switch 407. Similarly, switch 403 is operable to route data transmitted to or received from the second memory 105b via switch 405 or switch 407.

Switch 405 is operable to direct data either from the DACM 109 and device 115 to the first and second memories 105a, 105b, or to direct data from the first and second memories 105a, 105b to the DACM 109 and the device 115. On the other hand, switch 407 is operable to direct data either from the wireless transceiver 103 and DMC 107 to the first and second memories 105a, 105b, or to direct data from the first and second memories 105a, 105b to the wireless transceiver 103 and the DMC 107.

As shown in FIG. 3, outputs from two XOR gates 411, 413 control the "enable function" of the memories 105a, 105b respectively, where data can be written to/read from only when the memories 105a, 105b are enabled. If any of the memories 105a, 105b is not enabled, it is cut off from the rest of the circuit (tri-stated) within the module 101. The "enable" features of the memories 105a, 105b thus allow them to be cascaded on a common serial data bus.

In particular, the DMC 107 has default control of the first memory 105a while the DACM 109 has default control of the second memory 105b. In addition, the DMC 107 has priority over the DACM 109 to control the first memory 105a if both the DMC 107 and DACM 109 try to control it at the same time. On the other hand, the DACM 109 has priority over the DMC 107 to control the second memory 105b if both the DMC 107 and DACM 109 try to control it at the same time.

For example, if data were to be transferred from the wireless transceiver 103 to the first memory 105a, operation of the module 101 is as follows:

a) The DMC 107 first checks the output of the XOR gate 411 which determines whether the first memory 105a is to be enabled. In particular, the DMC 107 sets its "EN3" pin to a low logic, so that a high output logic of the XOR gate 411 means that the DACM 109 is communicating with the first memory 105a. In this case, the DMC 107 must either use the second memory 105b or abort the operation.

b) If the output logic of the XOR gate 411 is low, then it means that the DACM 109 is not communicating with the first memory 105a. The DMC 107 then set its "EN3" pin to a high logic and checks the output logic of the XOR gate 411 via its "DET1" pin. If the "DET1" pin receives a high logic, then it means that the DMC 107 has control of the first memory 105a. However, if the "DET1" pin receives a low logic, then it means that both the DMC 107 and DACM 109 are trying to take control of the first memory 105a at the same time. In this case, the DMC 107 will have priority over the DACM 109 to control the first memory 105a.

c) Once the DMC 107 has control of memory 1, it will then set the switch 407 accordingly to direct data from the wireless transceiver 103 to the first memory 105a.

It should be appreciated that the DMC 107 operates in a similar manner for directing data from the wireless transceiver 103 to the second memory 105b when the DACM 109 already has control of the first memory 105a.

It should further be appreciated that the DACM 109 also operates similarly to direct data from the device 115 to the second memory 105b when the DMC 107 does not already have control of the second memory 105b, or to direct data from the device 115 to the first memory 105a when the DMC 109 already has control of the second memory 105b.

FIG. 3 shows yet another switch 409 for directing data between the DMC 107 and either the DACM 109 or the device 115. If the DMC 107 wants to control the device 115, the following step will occur:

a) The DMC 107 first informs the DACM 109 to release control of the device 115.
b) The DACM 109 completes any pending transactions with the device 115.
c) The DACM 109 informs the DMC 107 that it can take control of the device 115.
d) The DMC 107 takes control of the device 115 by setting the switch 409 to connect to the device 115.
e) The DACM 109 monitors communication traffic between the DMC 107 and the device 115.

Figure 4:
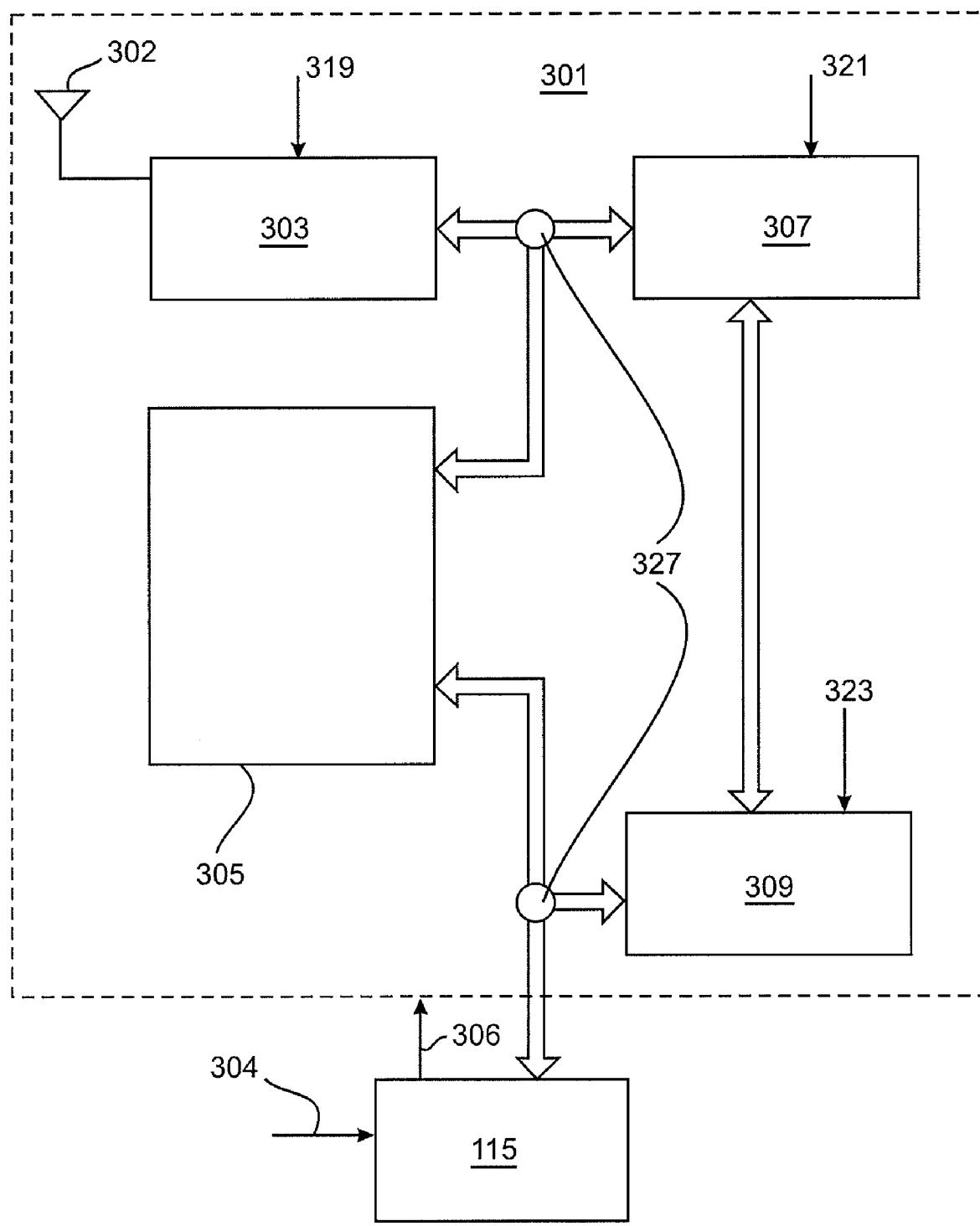
FIG. 4 is block diagram illustrating an architecture of a second embodiment of the data acquisition and/or control module.

FIG. 4 is a block diagram illustrating an architecture of a second data acquisition and/or control module ("module") 301 for interfacing with the device 115 within a sensor/control network. Like the first module 101, the second module 301 comprises an antenna 302, a wireless transceiver 303, two separate microcontrollers—i.e. a Data Management Controller ("DMC") 307 and a Data Acquisition and/or Control Manager ("DACM") 309—connected to each other, and a memory unit 305 external to both the DMC and DACM 307, 309. Further, a power source 304—e.g. batteries—is supplied to the device 115 which accordingly provides a voltage 306 to the second data acquisition and/or control module 301.

It should thus be appreciated that the antenna 302, wireless transceiver 303, DMC 307, DACM 309, and the memory unit 305 can be implemented using the same components as those of the module 101. In particular, the combination of the antenna 302 and wireless transceiver 303 can be replaced by the non-wireless communication unit, as mentioned earlier. Further, each of the wireless transceiver 303, DMC 307, and DACM 309 also has an independent clock generator 319, 321, 323 for producing timing signals to synchronise circuit operations.

The second module 301 also comprises switching means 327 operable to connect the memory unit selectively to one of the wireless transceiver 303 and DMC 307, or to connect the memory unit selectively to one of the DACM 307 and the device 115.

Thus, data received by the wireless transceiver 303 may first be stored within the memory unit 305 if the DMC 307 and DACM 309 are communicating with each other. When the DMC 307 and DACM 309 are no longer communicating with each other, the DMC 307 may then retrieve that data from the memory unit 305 for subsequent processing. Likewise, data transmitted from the device 115 may be first stored within the memory unit 305 if the DMC 307 and DACM 309 are communicating with each other. When the DMC 307 and DACM 309 are no longer communicating with each other, the DACM 309 may then retrieve that data from the memory unit 305 for subsequent processing. Thus, loss of data received by the wireless transceiver 303 or data transmitted from the device 115 to the module 301 may be prevented.

Figure 5:
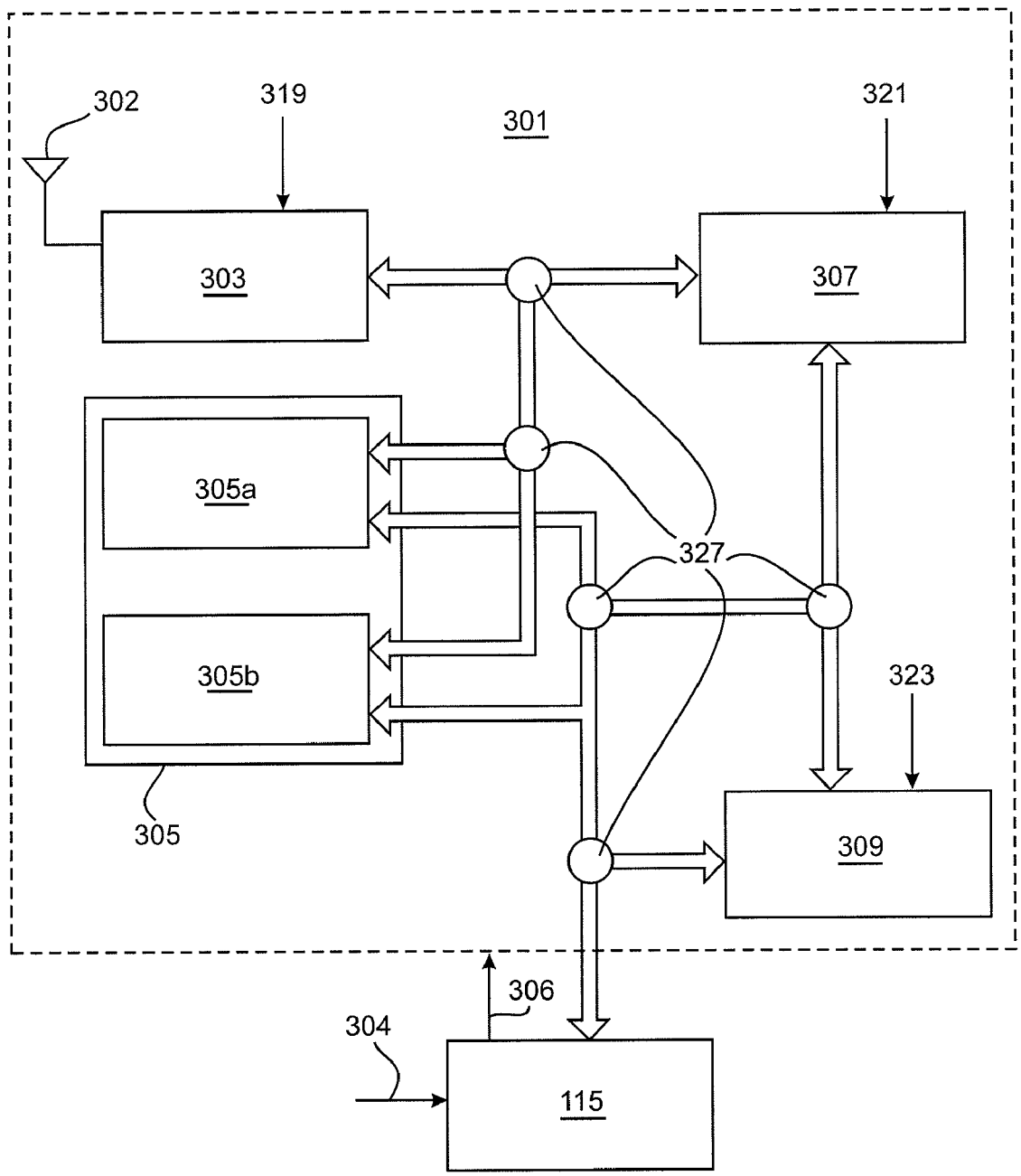
FIG. 5 is block diagram illustrating an alternative architecture of the data acquisition and/or control module of FIG. 4.

Optionally, the memory unit 305 comprises first and second memories 305a, 305b arranged external to the DMC 307 and DACM 309, as shown in FIG. 5. In this instance, the switching means 327 is operable to connect any of the wireless transceiver 303, DMC 307, DACM 309 and device 115 to any one of the first and second memories 305a, 305b. Accordingly, advantages of direct communication pathways established between any two components of the first module 101 can also be realised for the second module 301.

It should be appreciated that the switching means 327 of the second module 301 can also implemented by the switches 401, 403, 405, 407, and 409 of the first module 101, as shown in FIG. 3.

Figure 6A:
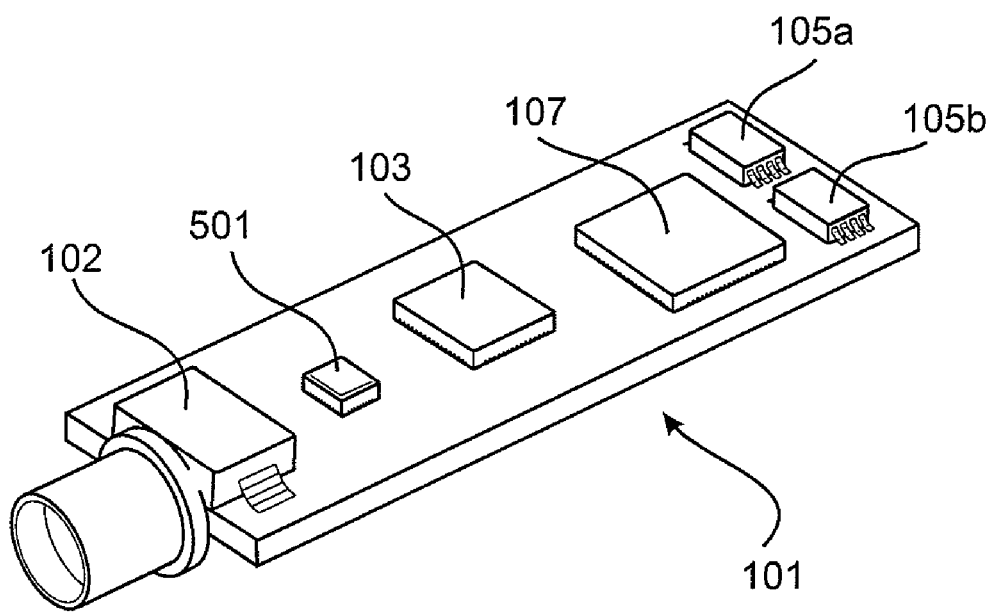
FIGS. 6a and 6b are diagrams illustrating the layout of the data acquisition and/or control module of the first embodiment.
Figure 6B:
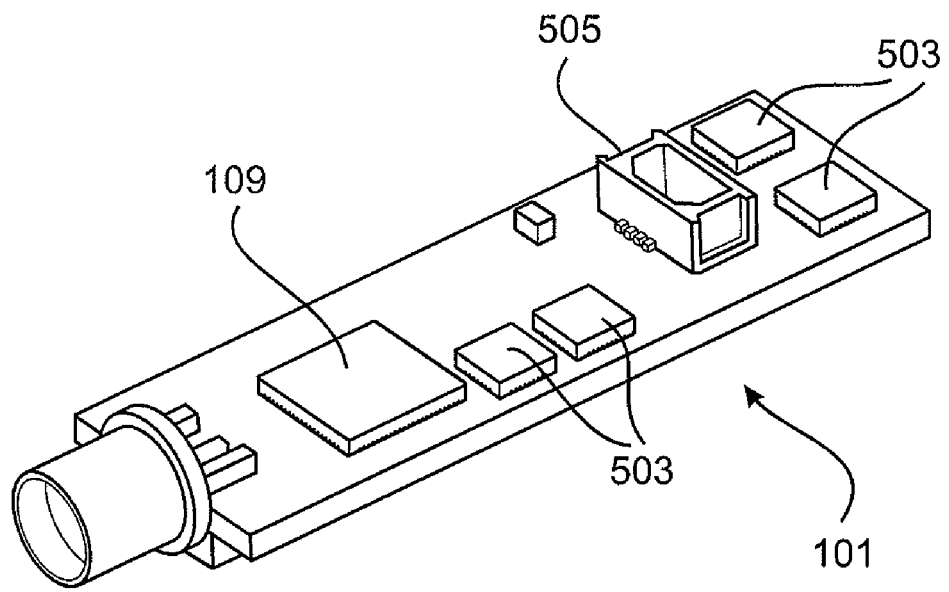

FIGS. 6a and 6b are diagrams illustrating opposing sides of the layout of the first module 101. In particular, FIG. 6a illustrates a power amplifier 501 for amplifying the RF signal from the wireless transceiver, switches 503 which are operable to establish direct communication pathways between each of the DMC 107 and DACM 109 and one of the first and second memories 105a, 105b, as well as the 9-pin header 505 for connecting the first module 101 with the device 115.

It should be appreciated that the layout of the second module 301 may also be identical to the layout of the first module 101, as shown in FIGS. 6a and 6b.

The device 115 for connecting to first and/or second modules 101, 301 may be grouped under any one of the following categories: (i) sensors; (ii) controllers; (iii) interfaces; and (iv) hybrids.

First, a sensor is a device which acquires (or sources) data such as temperature, pressure, speed, acceleration, position, distance, and orientation. The sensor may acquire data at high rates, for example 250-1000 KHz, process the data, and then notify the DACM 109, 309 that the data are ready for transfer.

Second, a controller is a device which consumes (or sinks) data. Examples of a controller include devices that control, for example, actuators, motors, solenoids, relays or indicators. The controller typically consumes data at a rate of between 1-500 Hz—which is comparatively slower than the data acquisition rate of sensors. Before the DACM 109, 309 sends data to the controller, the DACM 109, 309 first notifies the controller. If the controller is performing an activity, it will first complete that activity before notifying the DACM 109, 309 accordingly that it is ready to receive the data from the DACM 109, 309.

Third, an interface is a special type of device which enables an existing third party system to interface with the sensor/control network via a standard communication protocol. An example of such existing third party system is a sensor having only RS232 or Centronics type interfaces. The interface device thus allows communication between the sensor and modules 101, 301.

Figure 7:
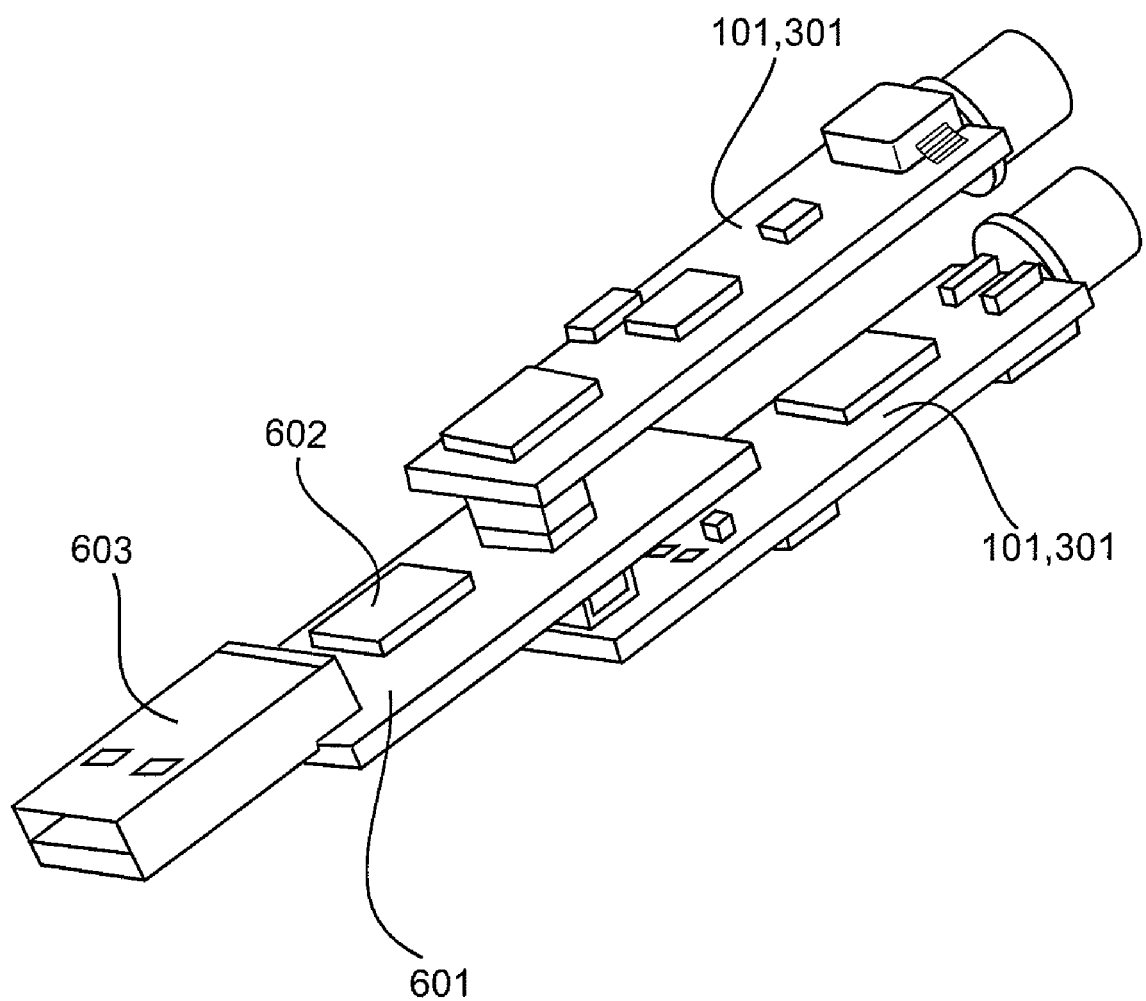
FIG. 7 is a diagram illustrating the layout of a USB interface device connected to two data acquisition and/or control modules of the first embodiment.

FIG. 7 illustrates an example of the interface device 601 comprising a USB connector 603, a microcontroller 602 and two modules 101, 301. The interface device 601 may connect to a corresponding USB socket of a computer either in the absence of a trailing cable or in the presence of a trailing cable. Such an interface device 601 is the Universal Serial Bus Device ("USBD"). The USBD 601 allows software on the computer to control the modules 101, 301 and their respective devices within the sensor/control network. Optionally, the microcontroller 602 of the USBD 601 is a Microchip 18F4450 microcontroller for controlling USB communications between the modules 101, 301 and the computer.

Last, a hybrid is a combination of a sensor and a controller which requires a two-way communication protocol for data transfer to and from the DACM 109, 309. To some extent, all devices are "hybrids" because any peripherals connected to a device will acquire data from an output of that device before transmitting a corresponding input to an input of that same device to indicate, for example, an error notification. However, data outputs and control inputs of hybrids in the context of this embodiment are more than just general handshake signals. For example, a motor with a feedback device is a hybrid because when the motor rotates, its speed is measured and sent from the hybrid to the DACM 109, 309. The DACM 109, 309 then feedbacks control data to the hybrid which adjusts the motor speed, if necessary.

Figure 8:
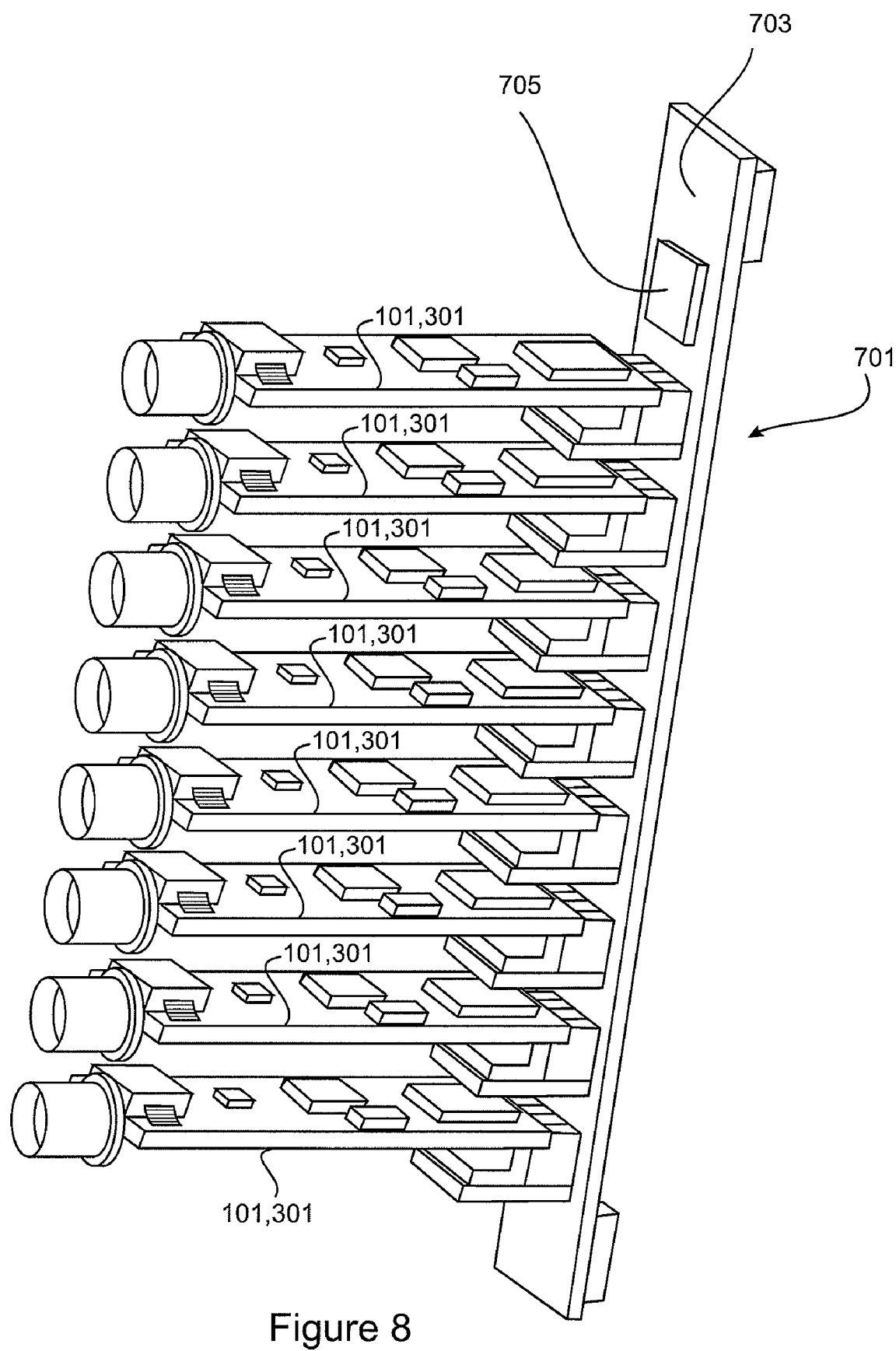
FIG. 8 is a diagram illustrating the layout of a computing apparatus comprising a plurality of data acquisition and/or control modules of the first and/or second embodiment(s)

FIG. 8 is a layout diagram of a computing device 701 which comprises a microcontroller 705 and a plurality of the modules 101, 301, all of which are arranged on a common serial bus 703. In this construction, data can be transferred at a high speed—for example 12 MHz—between the modules 101, 301. Each of the modules 101, 301 is typically related to a remote "module/device" combination of the sensor/control network. Because the modules 101, 301 are arranged on the common serial bus 703, data can be concurrently received by some or all those modules 101, 301 to be shared among themselves.

It should be appreciated that the computing apparatus 701 can be designed to connect any number of modules 101, 301 on the common serial bus 703.

Figure 9:
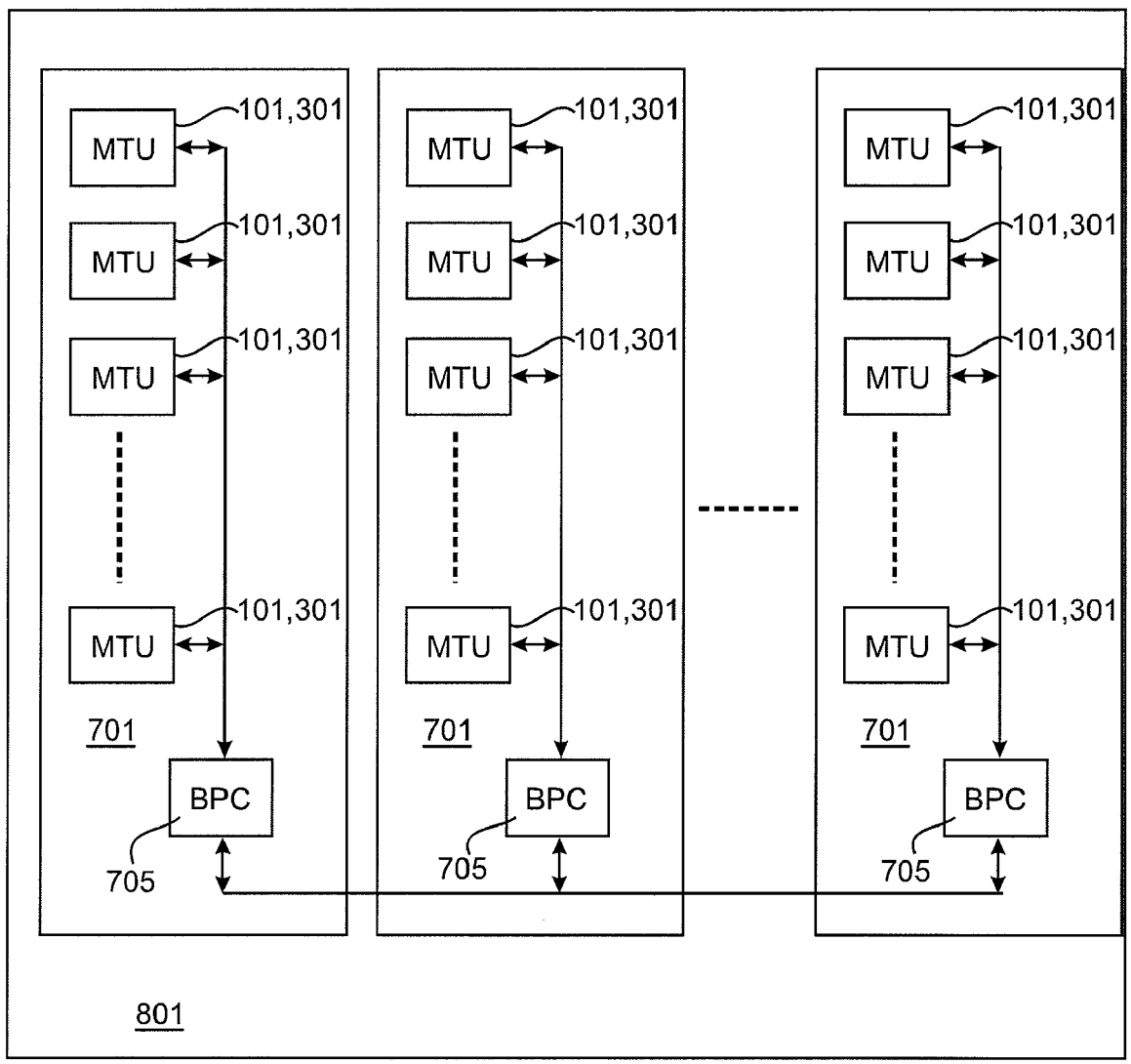
FIG. 9 is a diagram illustrating an array of the computing apparatus of FIG. 8.

The microcontroller 705 allows a plurality of computing device 701 to be connected together to form a computing array 801, as shown in FIG. 9. Within the computing array 801, a particular computing device 701 will collect data and then transfer it to other computing device 701 via a dedicated data bus (but separate from the common data bus as shared by the modules 101, 301 of each computing apparatus 701). The number of modules 101, 301 required for each computing apparatus 701, and the number of computing apparatus 701 required for each sensor/control network would depend on the size of data being transferred as well as the degree of connectivity of the sensor/control network.

Figure 10:
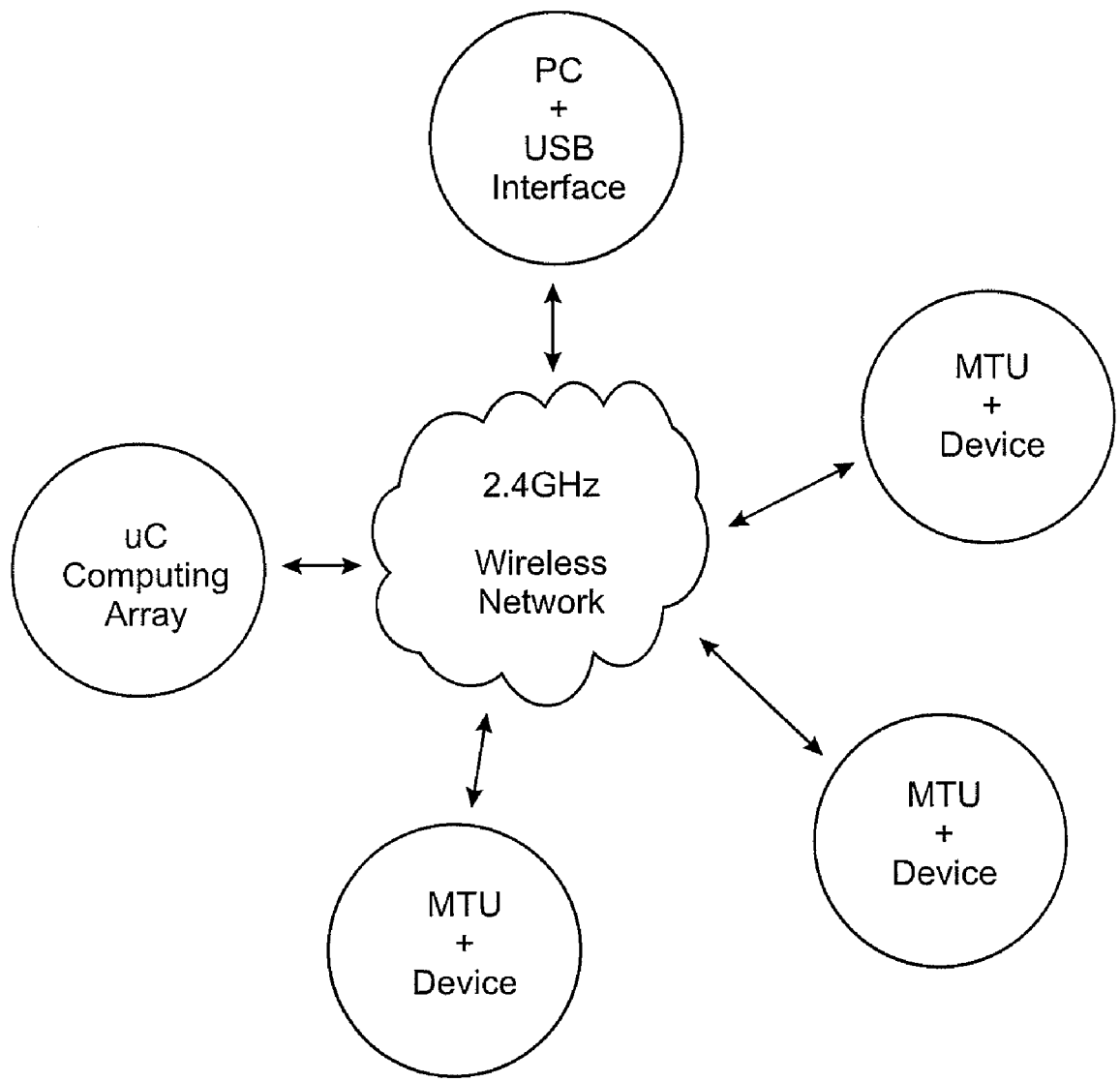
FIG. 10 is a diagram illustrating a distributed sensor/control network.

FIG. 10 illustrates the sensor/control network which comprises the following components: a) combinations of the modules 101, 301 with their respective devices; b) one or more USBD 601 connected to respective computers; and c) a computing array 801. Communication amongst these components of the sensor/control network during an initialising/configuring process will now be described below.

When power is supplied by the device 115 to the modules 101, 301, the DMC 107, 307 configures the wireless transceiver 103, 303 for default communications based on a particular wireless protocol. The DMC 107, 307 then attempts to register itself with the DACM 109, 309, and continues doing so until the DACM 109, 309 sends out a command signal informing the DMC 107, 307 that it has been successfully registered. The DMC 107, 307 then commands the wireless transceiver 103, 303 to listen on a default wireless communications channel for a registration command from the USBD 601. The USBD 601 has a list of addresses generated when it last performed module registration, and issues a registration command to each module 101,301 within the sensor/control network until all modules 101,301 in the USBD list have been successfully registered.

When the DMC 107, 307 receives the registration command from the USB 601, the DMC 107, 307 broadcasts its address within the sensor/control network. At the same time, the other modules 101, 301 within the sensor/control network listens for address broadcasts. When a module 101,301 detects an address broadcast, it records the address.

When all the modules 101, 301 within the USBD list have been registered, the USBD 601 issues a command for any unregistered module 101, 301 to broadcast its address. Any unregistered module 101,301 which receives this command waits for a random number of microseconds between 1 and 255 before it broadcasts its address. Again, all the modules 101, 301 in the network listen and record any address broadcasts. At some point, the module 101, 301 will receive a command from the USBD 601 that it has been successfully registered. The USBD 601 then requests an address list of each module 101, 301 for comparison with its own registry of modules 101, 301.

It is, however, possible that a module 101, 301 is initially unregistered for various reasons. First, it may be that the DMC 107, 307 was waiting for registration of the DACM 109, 309. Second, it may be that the module 101,301 was out of range of the USBD 601. Third, it may be that the DMC 107, 307 transmits its address data to the USBD 601 at the same time as another device within the sensor/control network, thus causing corruption of the data transmitted.

If a new address is received by the USBD 601, it will command the sensor/control network to be quiet while it interrogates each, previously unknown, module 101, 301. This procedure ensures that any module 101, 301 which were not registered on the first pass are registered by either direct interrogation or by using intermediate modules 101,301 as wireless relays.

When power is supplied to the device 115, the device 115 will attempt to register itself with the DACM 109, 309. The device 115 will not be registered until the DMC 107,307 has been registered with the DACM 109, 309. The device 115 will keep requesting registration with the DACM 109, 309 until the DACM 109, 309 sends out a command signal informing the device 115 of a successful registration.

When the device 115 has been registered, the DACM 109, 309 will request the communication speed and word length (either 8-bit or 16-bit) from the device 115. The DACM 109,309 may communicate this information at the default rate of 1 MHz and 8-bit word length—which is a default data transmission rate between the DACM 109, 309 and the devices 115 within the sensor/control network. The DACM and DMC typically communicate at 12 MHz, 16-bit word length.

Figure 11A:
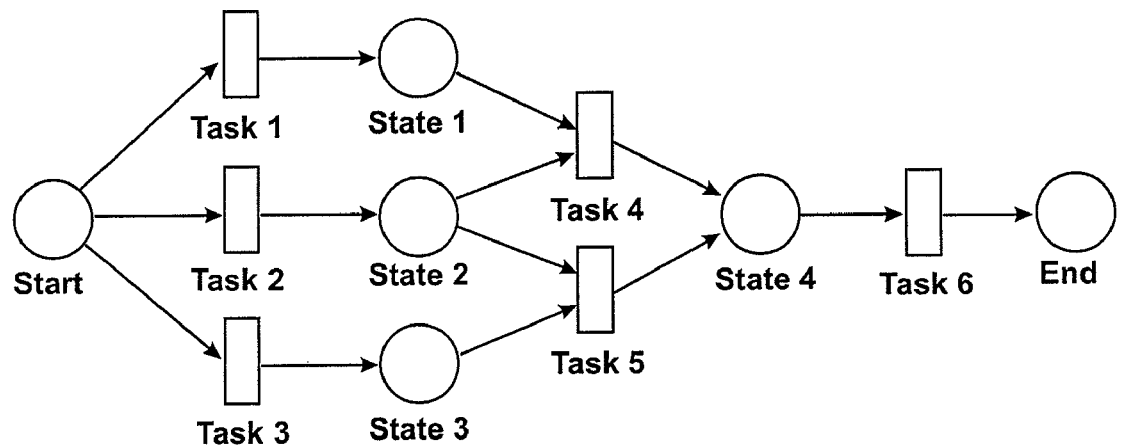
FIGS. 11a and 11b are diagrams illustrating computer modelling of the distributed sensor/control network using Petri Nets.
Figure 11B:
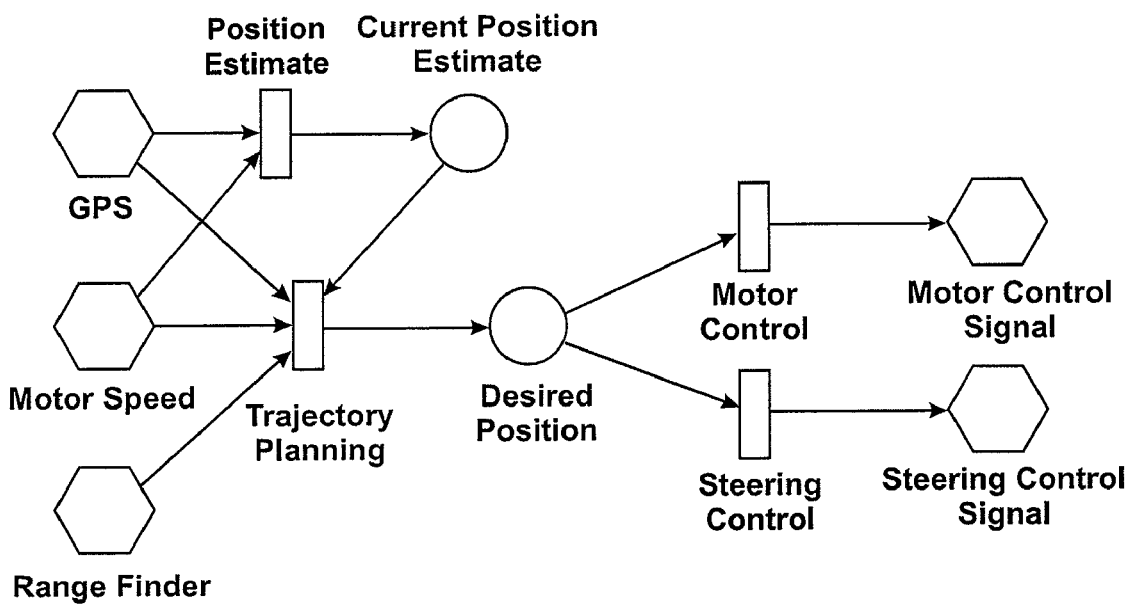

Computer software is used to provide a graphical user interface to configure individual devices 115, to establish data flow between the devices 115 and computing apparatus 701 and to create new data processing functions. For example, the computer software is based on a process modelling approach known as Petri Nets in which tasks are represented by node elements called "transitions" while states are represented by node elements called "places". FIG. 11a illustrates the concept of a Petri Net while FIG. 11b illustrates an application of Petri Net modelling for motor control and steering control.

When all the modules 101, 301 and the respective devices 115 have been registered with the USBD 601, the USBD 601 notifies the computer software of all the module-device combinations and their configuration details. Each of these module-device combinations is shown in the computer software as an icon. When a user right-click on a particular icon, a menu items will be shown which allow him to control the corresponding device 115.

All the transitions of the sensor/control network are compiled and transmitted from the computer to the computing apparatus 701. Transitions which are executed concurrently are assigned to distinct modules 101, 301 of the computing apparatus 701. For example, the "Tasks 1-3" transitions are executed concurrently when the "Start" state contains a token. Thus, each of these transitions will be transmitted to three separate modules 101, 301 of the computing apparatus 701. Accordingly, interaction of sub-systems within the sensor/control network can be efficiently controlled.

It should be appreciated that the invention has been described by way of example only and that various modifications in design and/or detail may be made without departing from the spirit and scope of this invention.

What is claimed is:

1. A data acquisition and/or control module for interfacing with a device and for communicating with one or more further data acquisition and/or control modules, each further module being for interfacing with a respective device within a sensor/control network formed by the data acquisition and/or control modules and the respective devices, the data acquisition and/or control module comprising:
   a transceiver for receiving data from and transmitting data to the sensor/control network;
   first and second microcontrollers, the first microcontroller being connected to the second microcontroller, the first microcontroller further being connected to the transceiver and the second microcontroller further being for connecting to the device;
   first and second memories, each memory being arranged external to the first and second microcontrollers; and
   switching means operable to connect:
      one of the first and second microcontrollers selectively to one of the first and second memories, and
      the respective other of the first and second microcontrollers to the respective other of the first and second memories.

2. The data acquisition and/or control module of claim 1, wherein the switching means is further operable to connect the transceiver selectively to one of the first and second memories.

3. The data acquisition and/or control module of claim 1, wherein the switching means is further operable to connect the device selectively to one of the first and second memories.

4. The data acquisition and/or control module of claim 1, wherein the switching means is further operable to connect the first microcontroller selectively to one of the second microcontroller and the device.

5. The data acquisition and/or control module of claim 1, wherein the transceiver is operable to transmit data wirelessly to and receive data wirelessly from the sensor/control network.

6. The data acquisition and/or control module of claim 1, wherein the transceiver is operable to transmit data non-wirelessly to and receive data non-wirelessly from the sensor/control network.

7. The data acquisition and/or control module of claim 1, further comprising a USB connector for interfacing with the device.

8. A data acquisition and/or control module for interfacing with a device and for communicating with one or more further data acquisition and/or control modules, each further module being for interfacing with a respective device within a sensor/control network formed by the data acquisition and/or control modules and the respective devices, the data acquisition and/or control module comprising:
a transceiver for receiving data from and transmitting data to the sensor/control network;
a first microcontroller connected to a second microcontroller, the first microcontroller further being connected to the transceiver and the second microcontroller further being for connecting to the device;
a memory unit arranged external to the first and second microcontrollers; and
switching means operable to connect selectively:
the memory unit to one of the first microcontroller and the transceiver, or
the memory unit to one of the second microcontroller and the device.

9. The data acquisition and/or control module of claim 8, wherein the memory unit comprises first and second memories.

10. The data acquisition and/or control module of claim 9, wherein the switching means is operable to connect the transceiver selectively to one of the first and second memories.

11. The data acquisition and/or control module of claim 9, wherein the switching means is operable to connect the first microcontroller selectively to one of the first and second memories.

12. The data acquisition and/or control module of claim 9, wherein the switching means is operable to connect the second microcontroller selectively to one of the first and second memories.

13. The data acquisition and/or control module of claim 9, wherein the switching means is operable to connect the device selectively to one of the first and second memories.

14. The data acquisition and/or control module of claim 8, wherein the switching means is further operable to connect the first microcontroller selectively to one of the second microcontroller and the device.

15. The data acquisition and/or control module of claim 8, wherein the transceiver is operable to transmit data wirelessly to and receive data wirelessly from the sensor/control network.

16. The data acquisition and/or control module of claim 8, wherein the transceiver is operable to transmit data non-wirelessly to and receive data non-wirelessly from the sensor/control network.

17. The data acquisition and/or control module of claim 8, further comprising a USB connector for interfacing with the device.

18. A computing apparatus comprising:
a plurality of data acquisition and/or control modules for communicating with the data acquisition and/or control modules defined by claim 1; and
a microcontroller,
wherein the plurality of modules and the microcontroller are arranged on a common data bus such that a communication pathway is established between the microcontroller and some or all of the modules.

19. A computing apparatus comprising:
a plurality of data acquisition and/or control modules for communicating with the data acquisition and/or control modules defined by claim 8; and
a microcontroller,
wherein the plurality of modules and the microcontroller are arranged on a common data bus such that a communication pathway is established between the microcontroller and some or all of the modules.

20. A sensor/control network comprising:
the computing apparatus of claim 18; and
a plurality of data acquisition and/or control modules, each module being for interfacing with a device and for communicating with one or more further data acquisition and/or control modules, each further module being for interfacing with a respective device within a sensor/control network formed by the data acquisition and/or control modules and the respective devices, the data acquisition and/or control module comprising:
a transceiver for receiving data from and transmitting data to the sensor/control network;
first and second microcontrollers, the first microcontroller being connected to the second microcontroller, the first microcontroller further being connected to the transceiver and the second microcontroller further being for connecting to the device;
first and second memories, each memory being arranged external to the first and second microcontrollers; and
switching means operable to connect:
one of the first and second microcontrollers selectively to one of the first and second memories, and
the respective other of the first and second microcontrollers to the respective other of the first and second memories.

21. A sensor/control network comprising:
the computing apparatus of claim 19; and
a plurality of data acquisition and/or control modules, each module being for interfacing with a device and for communicating with one or more further data acquisition and/or control modules, each further module being for interfacing with a respective device within a sensor/control network formed by the data acquisition and/or control modules and the respective devices, the data acquisition and/or control module comprising:
a transceiver for receiving data from and transmitting data to the sensor/control network;
first and second microcontrollers, the first microcontroller being connected to the second microcontroller, the first microcontroller further being connected to the transceiver and the second microcontroller further being for connecting to the device;
first and second memories, each memory being arranged external to the first and second microcontrollers; and
switching means operable to connect:
one of the first and second microcontrollers selectively to one of the first and second memories, and
the respective other of the first and second microcontrollers to the respective other of the first and second memories.

22. A sensor/control network comprising:
the computing apparatus of claim 18; and a plurality of data acquisition and/or control modules, each module being for interfacing with a device and for communicating with one or more further data acquisition and/or control modules, each further module being for interfacing with a respective device within a sensor/control network formed by the data acquisition and/or control modules and the respective devices, the data acquisition and/or control module comprising:

a transceiver for receiving data from and transmitting data to the sensor/control network;

a first microcontroller connected to a second microcontroller, the first microcontroller further being connected to the transceiver and the second microcontroller further being for connecting to the device;

a memory unit arranged external to the first and second microcontrollers; and switching means operable to connect selectively:
   the memory unit to one of the first microcontroller and the transceiver, or
   the memory unit to one of the second microcontroller and the device.

23. A sensor/control network comprising:
the computing apparatus of claim 19; and
a plurality of data acquisition and/or control modules, each module being for interfacing with a device and for communicating with one or more further data acquisition and/or control modules, each further module being for interfacing with a respective device within a sensor/control network formed by the data acquisition and/or control modules and the respective devices, the data acquisition and/or control module comprising:

a transceiver for receiving data from and transmitting data to the sensor/control network;

a first microcontroller connected to a second microcontroller, the first microcontroller further being connected to the transceiver and the second microcontroller further being for connecting to the device;

a memory unit arranged external to the first and second microcontrollers; and switching means operable to connect selectively:
   the memory unit to one of the first microcontroller and the transceiver, or
   the memory unit to one of the second microcontroller and the device.

* * * * *